F. J. KUHLEMEIER AND F. MEYER.
ROTATABLE OVEN.
APPLICATION FILED MAY 11, 1918. RENEWED NOV. 24, 1920.

1,377,592.

Patented May 10, 1921.

Inventors-
Fred J. Kuhlemeier,
Fred Meyer,
by E. W. Anderson & Son
Attorneys.

UNITED STATES PATENT OFFICE.

FRED J. KUHLEMEIER AND FRED MEYER, OF BURLINGTON, IOWA; SAID MEYER ASSIGNOR TO SAID KUHLEMEIER.

ROTATABLE OVEN.

1,377,592.

Specification of Letters Patent. Patented May 10, 1921.

Application filed May 11, 1918, Serial No. 233,995. Renewed November 24, 1920. Serial No. 426,308.

*To all whom it may concern:*

Be it known that we, FRED J. KUHLEMEIER and FRED MEYER, citizens of the United States, residents of Burlington, in the county of Des Moines and State of Iowa, have made a certain new and useful Invention in Rotatable Ovens; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
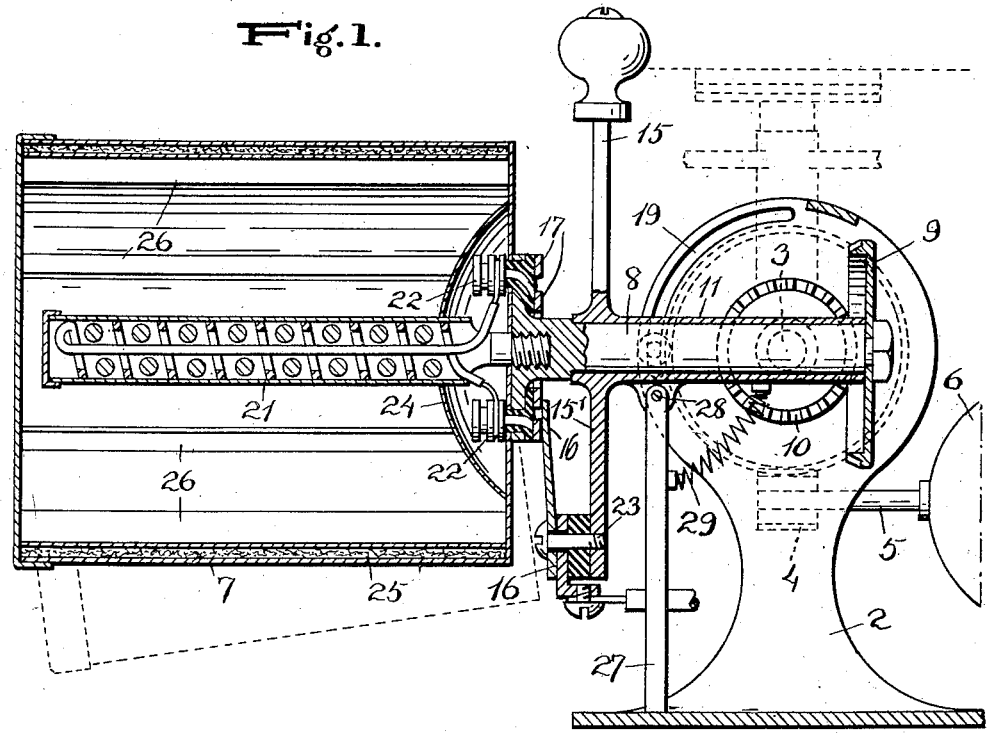
Figure 1 is a central longitudinal section of the invention, on the line 1—1, Fig. 2, the loading and dumping positions of parts being shown in dotted lines.
Figure 2:
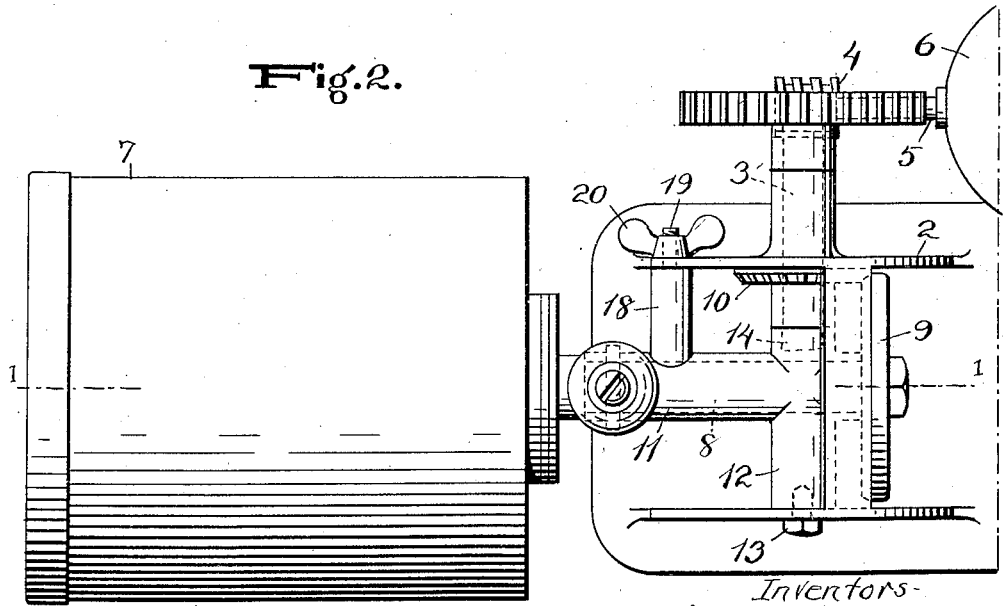
Fig. 2 is a plan view of the invention.

The invention has relation to roasting ovens for coffee, popcorn, peanuts, cereals, and also useful in drying fruits, toasting bread, baking potatoes, etc., the object being to provide an improved rotatable oven.

The invention consists in the novel construction and combinations of parts, as hereinafter set forth.

In the accompanying drawings, illustrating the invention, the numeral 2 designates an upright standard or support, having a shaft 3 journaled therein, said shaft having worm gear connection 4 with the shaft 5 of an electric motor 6, or other suitable engine.

7 is the oven, preferably of hollow cylindrical or drum form, the inner end plate of which has a central axle extension 8, projecting between the lateral members of said standard and provided at its end with a gear wheel 9, driven from a gear wheel 10 upon the shaft 3.

In order to support the oven, when in normal horizontal position, from the standard located beyond one end of the oven, the shaft 8 of the oven is surrounded by a sleeve shaft 11, said sleeve having at one end a cross arm 12, abutting at one end against one standard member, with which it is connected by pivot screw 13, and at its other end provided with a central recess or seat 14 for the inner end of the shaft 3; and between the pivot screw 13 and the lever 15 the sleeve is provided with a lateral extension 18, having slot and pin connection 19 with one of the standard members, the pin of said connection being threaded and a thumb or wing nut 20 being engaged therewith and serving to make the adjustment secure.

A handle lever 15 is fast to said sleeve, and is extended below the shaft 8 at 15′, being provided at its lower end with brushes 16, contacting with annular plates 17 upon the inner end plate of the oven or drum. Upon loosening the nut, the handle lever may be utilized to move the tubular oven, upon the pivot screw as a center, to upright loading position, the pin moving in the arcuate slot and the adjustment being made secure by the nut, as stated. The drum, being loaded, is lowered to normal horizontal position, being rotated by the gear connection with the motor. The roasting being completed, the drum is further lowered to slightly inclined position, the contents being automatically discharged.

The shaft 8 is provided with an electric heating unit 21, secured thereto and usually alined therewith, said unit located centrally of the cylindrical oven. Binding posts for the contact plates 17 are shown at 22, and serving for connection of the wires leading to the heating unit. Binding posts for the brushes are shown at 23. The oven is provided at its inner end with a shield 24 for the binding posts, the open ends of the oven being suitably closed. The peripheral wall of the drum or oven is usually lined with asbestos 25 or other non heat-conducting material, and this wall is provided with inwardly projecting longitudinal radial ribs or corrugations 26, which are designed to stir up the contents of the oven in the rotation thereof, to more evenly distribute the heat and prevent burning.

The sleeve 11 is preferably provided with a prop 27 hinged thereto at 28, and having normally at its lower end supporting engagement with the floor or base of the standard, said prop disengaged at its lower end from its floor bearing when it is desired to dump the contents of the roaster, a spring 29 serving to draw the prop upwardly out of the way.

This prop will support the oven in normal horizontal position and will render unnecessary the clamping of the nut 20 for this purpose.

We claim:—

1. In a roaster, a standard, a tubular receptacle having pivotal connection with said standard, and means for heating the receptacle comprising an electric heating element central and longitudinal of the oven and supported from one end thereof, binding posts for the conducting wires of said element and carried by said end of the oven, contact plates for said posts, supply brushes contacting with said plates, said oven adjustable upon said pivotal connection to upstanding loading position and to normal horizontal position without disturbance of the contact between said brushes and said plates.

2. In a roaster, a standard, a tubular receptacle having pivotal connection with said standard, and means for heating the receptacle, the latter adjustable upon said pivotal connection to upstanding loading position, to normal horizontal position and to inclined dumping position without disturbance of the continuity of the heating means, and a releasable prop for the oven to maintain it in horizontal position.

3. In a roaster, a tubular oven having an axial shaft at one end, a standard having an arcuate slot, a drive shaft connection with the axial shaft to rotate the oven, said oven having an end extension, a clamp bolt working in said arcuate slot and having connection with said extension, the oven adjustable to upstanding loading position and to normal horizontal position without disturbance of the continuity of the rotating means.

4. In a roaster, a tubular oven having an axial shaft at one end, a standard, a sleeve surrounding said shaft and having adjustable pivotal connection with said standard, a transverse shaft journaled in said standard and having rotatable connection with said axial shaft, said oven adjustable upon said pivotal connection to upstanding loading position and to normal horizontal position, an electric heating element central and longitudinal of said oven and connected at one end to the axial shaft, and an electric motor having driving connection with the transverse shaft.

In testimony whereof we affix our signatures, in presence of witnesses.

FRED J. KUHLEMEIER.
FRED MEYER.

Witnesses to signature of F. J. Kuhlemeier:
S. A. KRAUS,
JOHN M. HARRIS.

Witnesses to signature of Fred Meyer:
ARTHUR J. KLEIN,
RUBY A. MOBERG.